June 21, 1949.    W. B. BARNES    2,473,743
ANTIFRICTION SCREW AND NUT
Filed Feb. 19, 1945

INVENTOR.
WILLIAM B. BARNES
BY W. P. Hahn
ATTORNEY

Patented June 21, 1949

2,473,743

UNITED STATES PATENT OFFICE 2,473,743

ANTIFRICTION SCREW AND NUT

William B. Barnes, Muncie, Ind., assignor to Barnes Motor Developments Company, a partnership Application February 19, 1945, Serial No. 578,600

1 Claim. (Cl. 74—459)

The present invention relates to improvements in screw and nut structures.

It has for one of its objects that of providing a screw and nut structure whereby the friction between the parts is reduced to a minimum to provide easy running screw and nut structures whereby one of the members may be advanced axially relative to the other member, as a result of relative rotation with a minimum of application of power to the rotatable member.

Another object of the invention is to provide a ball bearing screw and nut structure, in which balls are adapted to operate in races formed between the threads of the two members and thereby, in effect, take the place of inter-engaging threads.

A further object of the invention is to provide a screw and nut structure in which balls or similar friction-reducing members are adapted to take the place of the inter-engaging threads of the ordinary commercial screw and nut, and provision is made whereby the balls will not be forced out of their helical raceways when they reach the end of a helix.

A further object of the invention is to provide means whereby balls which are substituted as the inter-engaging threads of a screw and nut structure which will be shifted back to the beginning of a helical raceway.

For the purpose of disclosing the invention an embodiment thereof is illustrated in the accompanying drawings in which Fig. 1 is a side elevation of a nut and screw embodying the invention;

Figure 3:
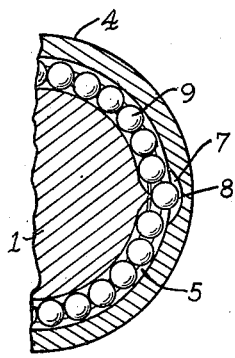
Fig. 3 is a sectional view taken on the line 3—3 of Fig. 1.
Figure 1:
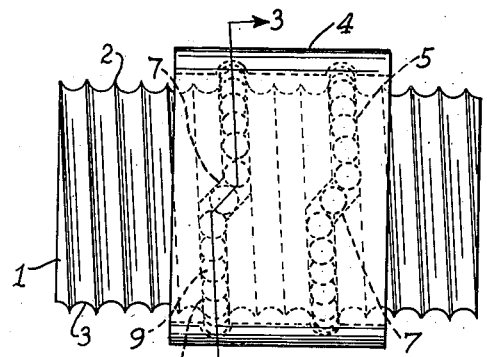
Figure 4:
Fig. 4 is a developed view of one of the helical raceways in the nut member.
Figure 2:
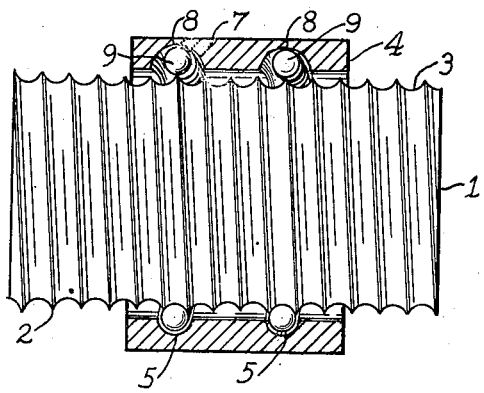
Fig. 2 is a side elevation, the nut being shown in sections.

In the embodiments of the invention illustrated, there is provided what may be termed a screw member 1 having a screw thread 2, the space between the threads forming a continuous helical groove comprising a ball race 3.

Operating on this screw member is a nut 4 having a pair of axially spaced apart internal ball races 5. Each of these races is in the form of a single helix 6. The ends of the helix of each race are connected by a crossover race 7, preferably taking the form of a helix extending in the opposite direction of the helix 6 and the depth of this crossover gradually increases from its ends toward the center with the center portion 8 being sufficiently deep to permit the balls 9 operating in the race to clear the top of the threads or race walls on the screw. There are sufficient balls 9 operating in the races to substantially fill each helix and its crossover on the nut 4. As a result of this arrangement, when the nut and threaded member are rotated relatively, as the balls approach the end of the helical raceway 5 on the nut member, they will gradually climb up, in the reverse helix crossover 7 until they can pass the top of the wall of the threaded member and drop back into the beginning of the helical race on the nut member.

By this arrangement, a nut and screw structure is provided wherein the friction between the parts is materially reduced to provide an extremely free running nut on a thread.

It is obvious that the threaded member may be the so-called nut member and that the helix may be arranged on the external surface of the other member.

It has been found that the friction between the parts is so far reduced that with the thread or shaft member supported for free rotation, very little pressure is required upon the nut member axially to cause rotation of the screw member, even where the screw member is provided with eight-pitch threads.

As illustrated in the drawings, in order to readily manufacture the structure, it is advantageous to cut the crossover helical race in a separate block 10 which may be inserted in an axially extending groove 11 in the nut.

Figure 5:
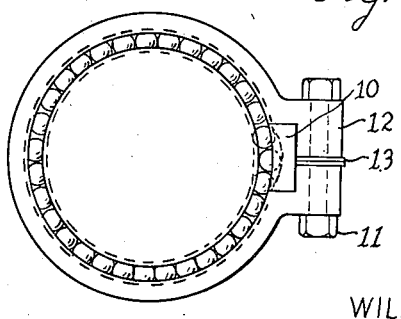
Fig. 5 is a sectional view of the modification of the structure illustrated in Figs. 1, 2 and 3.

Furthermore, in certain structures, it is frequently desirable to prevent a lash or looseness of the balls 9 in their races 3 and 5. In order to take up this lash and provide a relatively snug fit of the balls in the races, as illustrated in Fig. 5, the nut 4 may be longitudinally split and provided with extension ears 12. At this point, the insert block 10 for the crossover race may be placed. For holding the split nut together, a bolt 11 may be passed through the ears 12 and in order to get the correct adjustments of the parts, shims 13 are interposed between the ears. The thickness or number of shims 13, of course, will determine the extent to which the nut 4 is drawn together to tighten up with respect to the ball races. In order to provide for this adjustment, the block 10 may have a loose fit in its socket so that a certain amount of adjustment may be provided at the ears. This block 10 may be held in position in any suitable manner, as by pins securing the same in place or otherwise.

What is claimed as new is:

A nut and screw structure comprising a nut member and a screw member, one of said members having a helical channel therein having a raceway connecting the ends of the helix and the other having a screw channel therein, friction reducing balls mounted in said channels and means for varying the diameter of said nut member.

WILLIAM B. BARNES.

REFERENCES CITED

The following references are of record in the file of this patent:

UNITED STATES PATENTS

| Number | Name | Date |
|---|---|---|
| 439,660 | Holmquist | Nov. 4, 1890 |
| 582,074 | Melhuish | May 4, 1897 |
| 2,322,000 | Douglas | June 15, 1943 |
| 2,327,013 | Briggs et al. | Aug. 17, 1943 |

FOREIGN PATENTS

| Number | Country | Date |
|---|---|---|
| 129,196 | Great Britain | July 10, 1919 |
| 526,735 | Great Britain | Sept. 24, 1940 |